United States Patent Office 3,513,818
Patented May 26, 1970

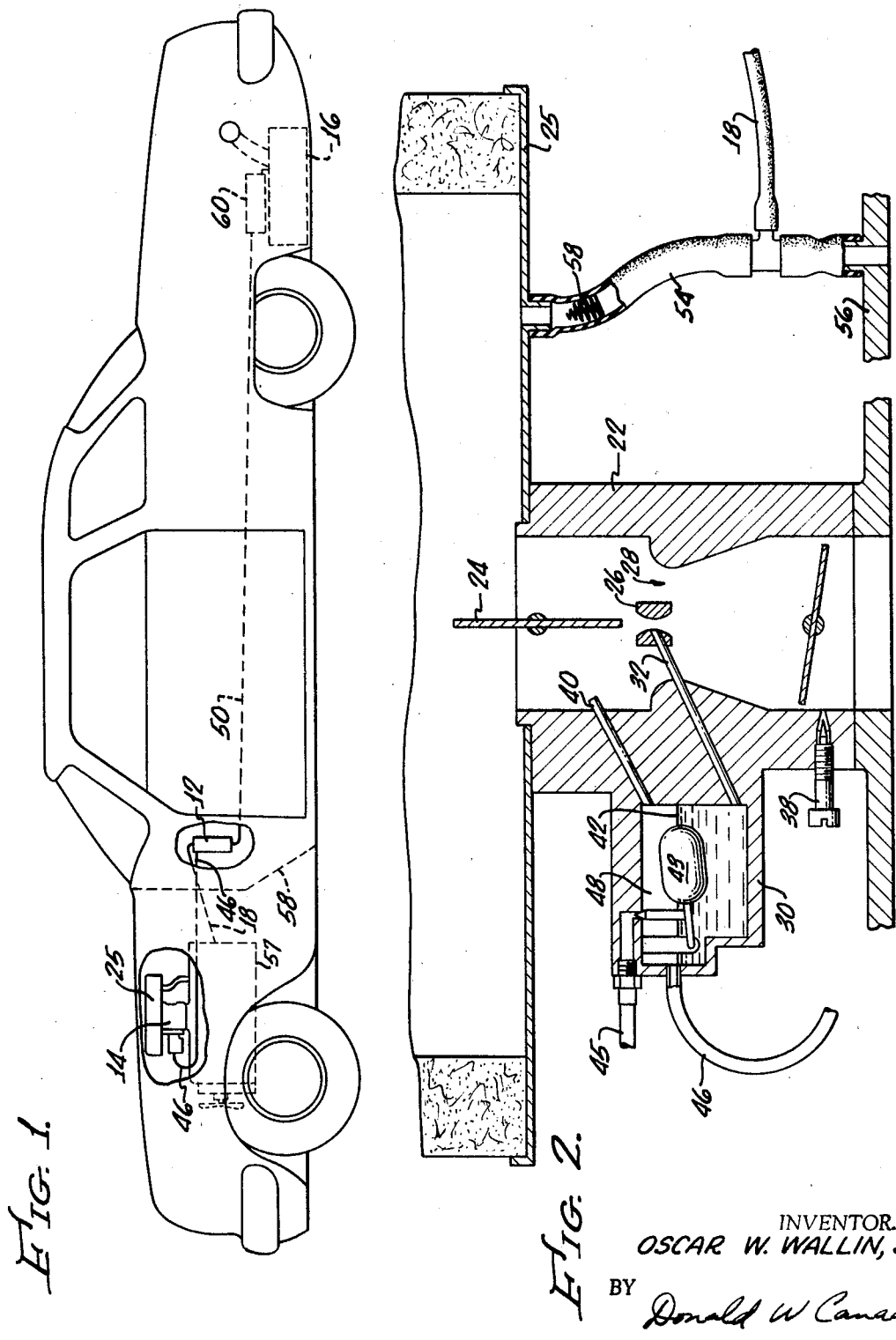

3,513,818
FUEL VAPOR RECOVERY SYSTEM
Oscar W. Wallin, Jr., La Canada, Calif., assignor to Atlantic Richfield Company, Philadelphia, Pa., a corporation of Pennsylvania
Filed Mar. 11, 1968, Ser. No. 712,281
Int. Cl. F02m 25/08, 27/02
U.S. Cl. 123—136
11 Claims

ABSTRACT OF THE DISCLOSURE

An automobile vapor recovery system employing a condenser positioned below the carburetor and above the fuel tank is provided with vent lines between the condenser and the carburetor float bowl, the crankcase, and the gas tank. The vent line between the condenser and the crankcase is a direct line and its position and relative size as compared with the vent line from the condenser to the float bowl, is such that the majority of the fuel vapors from the condenser will flow into the crankcase.

---

My present invention relates to a fuel vapor control system for internal combustion engine powered vehicles, and more particularly relates to an improved fuel evaporative emission control system for reducing atmospheric fuel vapor emissions from vehicles.

Several systems have been proposed to decrease air pollution by the prevention of contaminate fumes escaping internal combustion engine powered automobiles. Blowby or crankcase fumes are provided for by recycling gases from the crankcase into the induction system and it has also been proposed to recycle exhaust gas into the induction system. It has been further proposed to inject air into the exhaust manifold to support combustion of unburned hydrocarbons in the exhaust gas leaving the engine. A further source of air pollution which is not curtailed by the above mentioned air pollution control systems is the fuel lost to the atmosphere by evaporation from the fuel system, i.e., the carburetor and the fuel tank, through the various fuel system vents incorporated in standard automobile equipment. It has been previously proposed in a co-pending application of H. D. Daigh, Ser. No. 579,990, filed Sept. 16, 1966 now abandoned in favor of continuation-in-part application S.N. 715,811, now Pat. No. 3,448,731, to provide a condenser or container in which fuel vapors from the carburetor and the gas tank may be collected to condense and separate. Such proposal however included a vent line for the condenser which flows into the crankcase through an elevated "loop." It has been found however that employment of this system with some automobiles results in a tendency for vapors from the gas tank flowing through the condenser to flow through the line connecting the condenser with the carburetor bowl rather than through the vent line between the condenser and the crankcase, probably because of a static head imposed by the elevated loop. It is believed desirable, at least with some automobiles, to have the fumes from the gas tank and condenser line vented to the crankcase rather than the carburetor bowl since they are less likely to pass into the atmosphere from the crankcase than from the carburetor bowl.

Accordingly it is a prime object of my present invention to provide an automotive vapor recovery system wherein the majority of the fuel vapors escaping the gas tank are vented into the crankcase.

It is also an object of my present invention to provide an automotive vapor recovery system with a vapor condensing means connected with the carburetor float bowl and positioned below said bowl and above the fuel tank with a vent line between the condensing means and the crankcase through which a majority of the vapors escaping the condensing means flow directly into the crankcase rather than into the carburetor bowl.

It is also an object of the present invention to provide an automotive vapor recovery system employing a means for condensing vapors from the carburetor bowl and the fuel tank and providing an expansion chamber for liquid fuel escaping the fuel tank through the line between the condenser means and the fuel tank.

Other objects and a more complete understanding of my present invention may be had by reference to the following specification and the appended claims when taken in conjunction with the following drawings, wherein:

FIG. 1 shows diagrammatically the automotive vapor recovery system of my present invention; and FIG. 2 shows an enlarged view of the carburetor and crankcase ventilating line of a modified form of my present invention.

With reference to the drawings generally, my invention may be described briefly as an apparatus for recovering gasoline fuel vapors in a fuel system having all external vents plugged wherein a condenser 12 in the form of a fuel storage receptacle thermally insulated from engine heat to effect partial fuel condensation therein during the hot soak period is provided below the carburetor 14 and above the fuel tank 16 and vent lines are provided between the carburetor float chamber and the condenser (line 46) and between the condenser through which liquid fuel and fuel vapors can flow from the float chamber to the condenser receptacle for separation during engine operation and condensation during soak, and the fuel tank (line 50), so that the fuel vapors escaping the carburetor 14 and the fuel tank 16 are vented into a condenser 12 whereby they may be condensed and the condensate drained into the fuel tank 16. The condenser 12 may be appropriately vented through vent line 18 between the condenser and the crankcase 57. As best shown in FIG. 1, the carburetor 14 is of a conventional type with an air cleaner 25 positioned on top of the carburetor 14 over the choke valve butterfly 24. The carburetor venturi 26 in the carburetor throat 28 receives fuel from the float chamber or float bowl 30 through fuel line 32. A conventional idle adjustment needle 38 is provided in the carburetor body 22. Internal vent 40 vents the carburetor float chamber internally. All external carburetor and fuel system vents, including not starting vents, are closed off.

The fuel level 42 in the float chamber is determined by a float 43 which controls the fuel delivery into the carburetor float bowl through the fuel inlet 45 when the fuel level falls below the desired level. The carburetor vent line or skim line 46 is connected externally of the float chamber 30 just above the desired fuel level to provide venting or vapor removal from the air space 48 in the float chamber 30. Fuel vapors drawn off of the float chamber 30 through vent line 46 are passed into condenser 12 (see FIG. 1) where the vapors may be condensed and the condensate returned by gravity flow to the fuel tank 16.

The condenser 12 may be any suitably shaped container with a condensate drain line 50 proximate the bottom thereof so that liquids condensing in the condenser 12 may return through line 50 to the fuel tank 16. Preferably the carburetor vent line 46 is connected to the upper portion of the condenser 12. While container 12 is called herein, a condenser, since vapors from the carburetor may condense therein if a sufficient temperature gradient exists, container 12 is also a collector vessel for the fuel tank vapors and may also function as a liquid-vapor separator when both liquid fuel and fuel vapors exist together in the lines 18, 46 and 50 between the carburetor and the fuel tank.

The condenser is preferably installed in the coolest portion of the automobile such as within the passenger area of the car near the firewall 58 (as shown in FIG. 1) or over the chassis tunnel under the seat at such a vertical height that vapors from the carburetor 14 may drain by gravity to the condenser 12 and liquids condensed in the condenser may drain from the condenser 12 to the fuel tank 16 by gravity flow. The temperature gradient during the hot soak period will normally be on the order of 50° F. between the carburetor bowl and the condenser.

All external vents on the carburetor and the fuel tank are closed and a non-venting cap used on the fuel tank fill pipe. Preferably a combination vacuum-pressure relief cap of proper pressure range is desiable as a safety feature for protection during unusual atmospheric and opeating conditions.

The condenser 12 may be appropriately vented as through condenser vent line 18 directly into the crankcase 57 (FIG. 1). In the embodiment of my invention shown in FIG. 2, vent line 18 is connected directly to the crankcase ventilation line 54 between the air cleaner and the crankcase.

The relative size of the vent lines 46 and 18 should be such that a majority of the vapors from the condenser 12 pass into the crankcase 57 rather than return to the carburetor bowl 30. The passage of vapors from the condenser 12 into the crankcase 57 in preference to the vapor line to the carburetor float bowl is also favored by the gradual incline of the line 18 between the condenser 12 and crankcase 57, that is, the elimination of any vertical incline which would tend to create a static head for the vapors from the condenser to overcome prior to entry into the crankcase.

Preferably, the condenser vent line 18 is connected to the crankcase 57 or any part of the crankcase ventilating system. In the preferred form shown in FIG. 2, the condenser vent line 18 is connected to the fresh air line 54 between the crankcase and the air cleaner in a system wherein a recycle crankcase mechanism (not shown) is employed and air from the air cleaner 25 is drawn into the crankcase 57 and the crankcase subjected, at least to some extent, to the induction manifold vacuum through a suitable recycle valve (not shown). A slight vacuum on the crankcase would thus impose a slight vacuum on the condenser vent line 18. In systems not employing a crankcase recycle mechanism, the condenser vent line 18 may be connected to the air cleaner directly, and thereby subjected to the relatively low air cleaner vacuum.

A flame arrestor 58 (as shown in U.S. Pat. No. 3,237,617) may be positioned in the fresh air line 54 adjacent the air cleaner 25 to prevent flame propagation into the vapor recovery system and the crankcase through the fresh line 54 and the valve cover 56.

An expansion chamber 60 may be provided over the fuel tank to receive fuel which may be expelled from a full fuel tank due to thermal expansion, or positioning the car in a downhill position. The expansion chamber 60 is connected to line 50 between the condenser and the fuel tank.

EXAMPLE

Test automobiles C (a 1966 V8 Chevrolet 283 C.I.D. with manifold air injection) and F (a 1968 V8 Ford 303 C.I.D. with "Imco"), employing vapor recovery systems of the type shown in FIG. 1 were tested and the evaporative emissions from each automobile reduced to less than one gram per test which when evaluated by the proposed Federal test procedure is equivalent to a reduction of more than 95 percent.

The reduction of the evaporative losses on test cars C and F is shown in Table I. It can be noted from these data that evaporative losses for test car C were nil during the diurnal soak but a small amount of loss occurred during hot soak. Small losses from car F occurred both during the diurnal and hot soak cycles.

In order to determine the relative amount of evaporated fuel escaping through external vents of automobiles C and F while not employing the vapor recovery system of FIG. 1, the quantity of fuel vaporized during hot soak was calculated from the $V/L$ (vapor-liquid ratio) characteristics of the fuel, the carburetor bowl temperature and the bowl capacity. The results were then compared with measured losses from the external vents. The relative percentages venting externally for each of the two cars appears in Table II.

TABLE I.—REDUCTION OF EVAPORATION LOSSES

| | Test Car C—Loss, gms. | | | | Test Car F—Loss, gms. | | | |
|---|---|---|---|---|---|---|---|---|
| | Tank | Carburetor | Air Cleaner Inlet | Total | Tank | Carburetor | Air Cleaner Inlet | Total |
| Without V-V-R System: [1] | | | | | | | | |
| Diurnal Soak | 10.2 | 0.4 | 0 | 10.6 | 11.4 | 0.5 | 0 | 11.9 |
| Operation | 5.8 | | | 5.8 | 5.4 | | | 5.4 |
| Hot Soak | 0.5 | 5.0 | 0 | 5.5 | 2.4 | 4.1 | Trace | 6.5 |
| Total | | | | 3 | 21.9 | | | 23.8 |
| With V-V-R System: | | | | | | | | |
| Diurnal Soak | | | | 0 | 0 | | | 0.2 | 0.2 |
| Operation | | | | | | | | |
| Hot Soak | | | 0.4 | 0.4 | | | 0.2 | 0.2 |
| Total | | | | 0.4 | | | | 0.4 |

[1] V-V-R System=Vehicle Vapor Recovery System of the type shown in FIG. 1.
Test Location—Chassis Dynamometer.
Ambient Temperature—85° F.
Test Procedure—Proposed Federal Evaporation Loss Test.

TABLE II.—CARBURETOR SOAK LOSSES VENTING EXTERNALLY

| | Temperature, °F | | | Hydrocarbon Loss | | | |
|---|---|---|---|---|---|---|---|
| | | | Bowl Capacity, ml. | Total Evap.[1] (Calc.) | | Recovered [2] | |
| Test Car | Ambient | Carburetor Bowl (max.) | | Percent | Ml. | Ml. | Percent |
| C | 76 | 152 | 73 | 13.9 | 10.2 | 8.0 | 79 |
| F | 85 | 156 | 90 | 17.0 | 15.3 | 5.0 | 33 |

[1] Calculated from $V/L$ data for fuel.
[2] Recovered from external vent during 1 hour soak period.

An inspection of the data reveals that 79 percent of the carburetor hot soak losses from car C vented externally whereas only about 33 percent of those from car F vented externally. Fuel pump and carburetor design variables may have affected this percentage. The carburetor on test car C had less internal venting capacity than car F. Furthermore, the fuel line pressure was not relieved during soak which may have contributed to after fill and higher losses. Conversely, the carburetor on test car F had approximately twice the internal venting capacity and bleed back orifices in the fuel pump relieved fuel line pressure within a period of three to four minutes after turning off the ignition. It was determined that substantial loss of fuel vapors through the air cleaner during hot soak did not occur. Carburetor losses during vehicle operation were minimal since most carburetor external vents are closed during operation which prevents loss to the atmosphere. For those vehicles equipped with carburetors which are vented externally during operation, the capacity of the internal venting and the slightly negative bowl pressures are usually sufficient to preclude the escape of vapors externally.

It was found that condensation will occur if a substantial temperature differential, e.g., 50° F. or more, exists between the unit in which vaporization occurs and the point of condensation. Of the various test cycles observed a temperature differential of this magnitude normally occurs only during hot soak, i.e., only during hot soak was there a sufficient temperature differential between the separator and the fuel system components for condensation to occur.

The test car employing the vapor recovery system shown in FIG. 1 was found to be preferably to an alternate configuration wherein the vapor return line between the separator and the crankcase ventilating system contained an elevated loop, i.e., the vapor line extended up the door post to the roof and back down the windshield post to the crankcase (configuration #1). Table III shows a comparison of the two systems and clearly shows that the configuration (#2) shown in FIG. 1, is preferred from the standpoint of expelling vapors into the crankcase rather than the carburetor bowl.

flow to the carburetor via the skimming line. In test car F which utilized the vapor cover system in FIG. 1 vapor disposition was predominantly to the crankcase during the diurnal soak operation, and hot soak. The differences in vapor disposition between test cars C and F are believed to be the result of small differences in design between the two vapor recovery systems and differences in the design of the fuel systems and engine components for the two vehicles.

Various modifications can be made in the form of my invention described above without departing from the scope of my invention, and my invention is to be afforded the full scope of the appended claims.

I claim:

1. An improvement in an internal combustion engine powered vehicle adapted to minimize evaporative fuel losses, wherein an unvented fuel system is provided, and fuel is withdrawn from a fuel tank to a carburetor which supplies an air-fuel mixture for combustion in said engine, comprising in combination:
  (a) a fuel storage receptacle thermally insulated from the heat of the engine and exhaust system so that during the soak period a temperature gradient sufficient to effect partial fuel condensation in said receptacle exists between said receptacle and said carburetor,
  (b) a first vent line between said carburetor float chamber and said receptacle through which liquid fuel and fuel vapors can flow from said float chamber to said receptacle for separation during engine operation and condensation during said soak period,
  (c) a second vent line between said receptacle and said fuel tank through which said fuel separated and said fuel condensed in said receptacle may flow to said fuel tank,
  (d) means including a third vent line from said receptacle to said engine crankcase for venting said receptacle into said crankcase to permit storage of vapors from said fuel system in said crankcase during the engine soak period, said third vent line being either substantially horizontal or declining slightly from the horizontal between said condenser and said crankcase, said crankcase being at a lower pressure

TABLE III.—VAPOR DISPOSITION WITH THE V-V-R SYSTEM

|  |  |  | Vapor Disposition | | |
| --- | --- | --- | --- | --- | --- |
|  |  |  | Percent | | |
|  |  |  | Car C | | |
| Test Cycle | Vapor Source | To | Conf. #1 | Conf. #2 | Car F, Conf. #2 |
| Diurnal Soak | Tank | Carb. Bowl | 100 | 52 | 2 |
|  |  | Crankcase | 0 | 48 | 98 |
| Operation | do | Carb. Bowl | 68 | 91 | 0 |
|  |  | Crankcase | 32 | 9 | 100 |
| Hot Soak | Carb | Crankcase | 65 | 97 | 0 |
|  |  | Tank | 35 | 3 | 0 |
|  | Tank | Carb. Bowl |  |  | 0 |
|  |  | Crankcase |  |  | 100 |

The data of Table III was obtained by positioning cold traps in back-to-back relationship in the tank vapor line, the carburetor skimming line, and the separator vapor return line to determine the approximate quantity and destination of hydrocarbon vapor flow during each phase of the test cycle. As can be seen in the data shown on Table III the vapor recovery system using the elevated loop in the condenser vent line (configuration #1) causes all of the tank vapors to flow to the carburetor bowl during the diurnal soak, and during hot soak two-thirds of the vapor from the carburetor bowl flows to the crankcase with one-third returning to the fuel tank. The removal of the loop from the separator vapor return line (configuration #2) permitted a greater percentage of vapors to flow to the crankcase during the two soak periods which indicates that perhaps the static head imposed by the elevated loop of configuration #1 diverted vapor than said condenser and said fuel system during said soak period whereby said vapors are drawn into said crankcase, and
  (e) means including a closed crankcase ventilation system for subsequent engine consumption of said vapors stored in said crankcase.

2. The apparatus of claim 1, including an expansion chamber adjacent said fuel tank in communication with said second vent line providing fuel storage means for any liquid fuel expelled from said gas tank.

3. The apparatus of claim 1 wherein said means for consumption comprises ventilation means provided between said crankcase and the induction system of said engine, and wherein said third vent line connects with said ventilation means.

4. The apparatus of claim 1 wherein the bore of said third vent line is larger than the bore of said first vent line.

5. The apparatus of claim 1 wherein said fuel storage receptacle is in thermal communication with an area substantially cooler than said engine.

6. The apparatus of claim 1 wherein said fuel storage receptacle is positioned below said carburetor and above said tank whereby fuel may flow by gravity from said carburetor to said receptacle through said first vent line and from said receptacle to said tank through said second vent line.

7. The apparatus of claim 1 including means for subjecting said condenser to a slight vacuum.

8. The apparatus of claim 1 wherein said carburetor vent line connects to said float chamber just above the desired fuel level.

9. In an unvented fuel system adapted to minimize evaporative losses from an internal combustion engine powered vehicle, wherein fuel is withdrawn from a fuel tank to a carburetor which supplies an air-fuel mixture for combustion in said engine, the improvement comprising:

means including a conduit external to said engine, said conduit extending between said carburetor float bowl and the vapor space of said fuel tank, and having a fuel storage receptacle interdisposed therein, means including a vent line extending from said conduit horizontally or slightly declining from said means to said engine crankcase, for venting said conduit vapors from said fuel system in said crankcase during the engine soak period, said vapors from said fuel system passing into said crankcase during said soak period in response to a pressure drop between said fuel system and said crankcase during said soak period, and means including a closed crankcase ventilation system for subsequent engine consumption of said vapors stored in said crankcase.

10. The system of claim 9 wherein said vapor consumption means is a conduit from said crankcase to the clean air side of the carburetor air cleaner.

11. The system of claim 9 wherein the bore of said vent line is larger than the bore of said conduit.

References Cited

UNITED STATES PATENTS

| | | | |
|---|---|---|---|
| 2,894,736 | 7/1959 | Wentworth | 123—136 |
| 3,172,348 | 3/1965 | Berg | 123—136 XR |
| 3,191,587 | 6/1965 | Hall | 123—136 XR |
| 3,221,724 | 12/1965 | Wentworth | 123—136 |

LAURENCE M. GOODRIDGE, Primary Examiner

U.S. Cl. X.R.

123—121